Sept. 2, 1924.
A. WESSIG
SIGNALING DEVICE
Filed Nov. 16, 1921
1,506,798
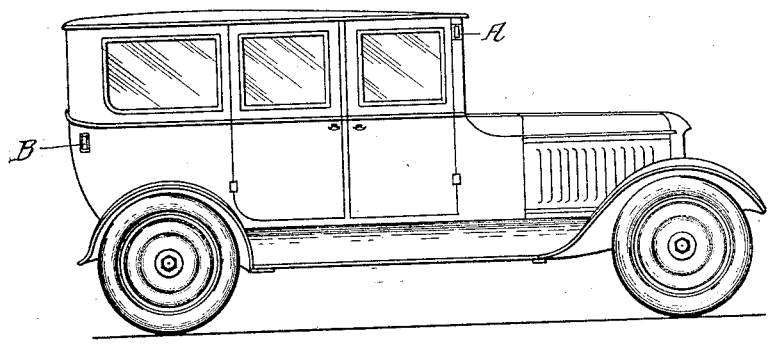
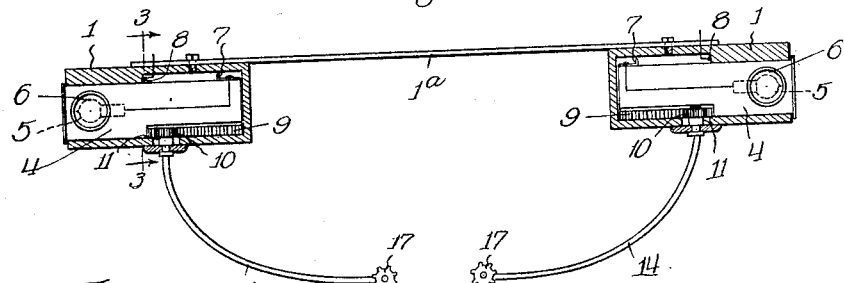
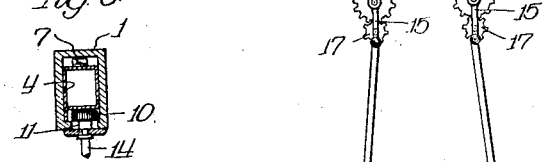
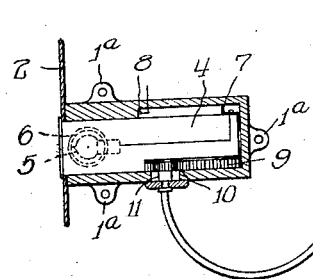
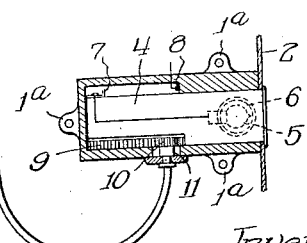

Patented Sept. 2, 1924.

1,506,798

UNITED STATES PATENT OFFICE.

AUGUST WESSIG, OF CHICAGO, ILLINOIS.

SIGNALING DEVICE.

Application filed November 16, 1921. Serial No. 515,469.

*To all whom it may concern:*

Be it known that I, AUGUST WESSIG, a citizen of Germany, residing at Chicago, in the county of Cook and State of Illinois, have invented certain new and useful Improvements in a Signaling Device, of which the following is a specification.

This invention relates to improvements in construction of signaling devices of a type designed to be carried on road vehicles and operated for the purpose of indicating contemplated movements of the vehicle.

The general object of the invention is the provision of a signaling device which will give an indication both at the front and the rear of the vehicle and which will indicate a contemplated change of direction in the movement of the vehicle.

Another object of the invention is the provision of an apparatus of the type described which may be conveniently incorporated within the body structure of the vehicle, so as to be out of sight when not actually in use.

Another object is the provision of such an apparatus which may be operated quickly and directly by positive mechanical instrumentalities, whereby certainty of operation is assured.

Other and further objects of the invention will be pointed out hereinafter, indicated in the appended claims, or obvious upon an understanding of the invention from the following description and the accompanying drawing forming a part of this specification. In the said drawing is illustrated one structural arrangement in which the invention may be embodied, but it is to be understood that the same is here presented for purpose of illustration merely, and therefore is not to be construed as exhaustive of all structural forms within the scope of the invention.

In the said drawing—

Fig. 1 is a side elevation of an automobile illustrating the assembly of my signaling apparatus therewith;

Fig. 2 is an illustration, partly diagrammatic, of my improved signaling apparatus and its actuating means, the several signaling devices being shown in sectional elevation; and Fig. 3 is a transverse sectional elevation of one of the signaling devices.

My invention contemplates the provision of operable signaling devices positioned at the front and at the rear of the vehicle, said signaling devices including movable members, which preferably carry lamps, which members are adapted to be projected and retracted, functioning, in their projected position, to indicate the direction of contemplated movement of the vehicle. Operating means is associated with these signaling devices whereby they may be positioned as desired by the operator of the vehicle. The construction of the signaling devices is such that they may be embodied or enclosed within the body structure of an automobile, whereby they are completely housed when retracted. The several features of the invention may be understood by reference to the drawings in detail, in which the reference character A is utilized to indicate generally the signaling devices disposed at the front of the vehicle, and the character B to designate those disposed at the rear of the vehicle. Each of these signaling devices comprises a casing or housing 1 of general flat rectangular form, preferably closed at its inner end and open at its outer end, so as to afford an elongated narrow chamber of general rectangular form. These casings are provided with suitable means whereby they may be mounted on appropriate portions of the vehicle, said means being indicated generally by the reference character $1^a$. When mounted within the body portion of the vehicle, the latter is formed with apertures registering with the end opening of the chamber in the housing. The reference character 2 is utilized in Fig. 3 to designate portions of the vehicle body sheathing illustrating the relationship of the signaling devices thereto. In Fig. 1 the rear signaling device is shown as thus housed within the body of the vehicle while the front signaling device may be mounted on an appropriate front portion of the windshield or vehicle top.

Each of the signaling devices includes a slidably mounted indicating member 4 in the nature of a slidable frame or bar fitting in the chamber of the casing member and guided for longitudinal movement therein so that the indicating arm may be projected from the casing and withdrawn thereinto. Each indicating arm carries adjacent its outer extremity a lamp 5 which may be disposed between suitable bull's-eyes 6 so that each lamp may show a red light to the rear and a green light to the front. These lamps are adapted to be energized by the closing of a circuit through contact members 7 and 8 which are included in an electric circuit supplied from the generating or storage system of the vehicle. The means for actuating the indicating arms includes a rack 9 carried on each of the indicating arms, and a cooperating pinion 10 mounted in a bearing 11 on the casing 1. The arrangement is such that rotation of the pinion 10 will transmit the rack longitudinally, and thus move the indicating arm to a position projected from the casing or within the same. These pinions 10 are designed to be driven through the instrumentality of any suitable power transmitting means, such as flexible shafts 14, to which movement may be transmitted by a hand actuated mechanism such as the cranks 15 by which the driving pinion 16 may be rotated to drive pinions 17 conjoined to portions of the flexible shafting 14. The mechanism actuated from one of the cranks 15 is arranged to operate the indicating arms on one side of the vehicle, while indicating devices on the other side of the vehicle are operated from the other crank. In this fashion the front and rear indicating devices on one side of the vehicle may be operated simultaneously. The movement of the indicating arms to extended positions constitutes a signal which will be indicative of a contemplated change in direction of the vehicle, the indicating arms on the right side of the vehicle being projected when it is intended to turn to the right, and vice versa. When the energizing circuits are connected to a suitable source, the lamps on the projected indicating arms will be energized by the movement of the contact 7 into engagement with the contact 8. When the signaling arms are retracted they close the open ends of the casing, preventing the ingress of dust, rain and the like, and when projected they likewise occupy the entire area of the casing opening so that foreign material cannot find its way into the latter.

I claim:

1. The combination with the vehicle body sheathing having an opening therein, of an indicating member housed within the sheathing and operable for projection and retraction through said opening, said indicating member including portions arranged to close said opening in either projected or retracted positions, and means for shifting the indicating member.

2. In a signalling apparatus for vehicles, the combination of a housing adapted to be mounted upon the vehicle and opening laterally thereof, an indicating arm slidably mounted for movement longitudinally in said housing and arranged to close the opening thereof when in either projected or retracted position, a lamp carried by said arm for movement into and out of the casing therewith and means for actuating the arm to move it to extended and retracted positions.

In testimony whereof I have hereunto signed my name.

AUGUST WESSIG.